United States Patent [19]
Levine

[11] 4,375,916
[45] Mar. 8, 1983

[54] PHOTOCOPIER SYSTEM WITH PORTABLE DETACHABLE READER

[76] Inventor: Alfred B. Levine, P.O. Box 2763 (EADS), Arlington, Va. 22202

[21] Appl. No.: 234,252

[22] Filed: Feb. 13, 1981

Related U.S. Application Data

[63] Continuation-in-part of Ser. No. 925,290, Jul. 17, 1978, Pat. No. 4,251,153, which is a continuation-in-part of Ser. No. 775,480, Mar. 8, 1977, abandoned, Ser. No. 718,260, Aug. 27, 1976, Pat. No. 4,182,568, and Ser. No. 39,107, May 15, 1979, Pat. No. 4,236,813.

[51] Int. Cl.³ .......................................... G03G 15/00
[52] U.S. Cl. ........................................ 355/5; 355/40; 355/56; 355/75

[58] Field of Search ..................... 355/5, 3 R, 74, 75, 355/55-60, 14 R, 40-43; 346/153.1, 160

[56] References Cited

U.S. PATENT DOCUMENTS 3,597,071 7/1971 Jones .................................. 355/3 R Primary Examiner—R. L. Moses

[57] ABSTRACT

A portable, detachable image reader and memory for use with a photocopy machine to read and temporarily store video images of documents and objects to be copied; and provided with one or more additional features including adjustable focusing for documents of different size, legability indicators to provide an estimate of the reproducibility of the video image, document levelers, and others.

12 Claims, 12 Drawing Figures

PHOTOCOPIER SYSTEM WITH PORTABLE DETACHABLE READER

COPENDING APPLICATIONS

This application is a continuation-in-part of application Ser. No. 925,290, filed July 17, 1978 now U.S. Pat. No. 4,251,153, which is a continuation-in-part of Ser. No. 775,480, filed Mar. 8, 1977, (abandoned), and of Ser. No. 718,260, filed Aug. 27, 1976 (U.S. Pat. No. 4,182,568), and of Ser. No. 39,107, filed May 15, 1979 (U.S. Pat. No. 4,236,813).

BACKGROUND OF THE INVENTION

In earlier application Ser. No. 925,290, now U.S. Pat. No. 4,251,153 a photocopier system is provided having one or more detachable, portable optical reader units, each having a recorder or memory, that may be carried about by the user for reading and temporarily storing a video image of a printed document or other optical image to be copied and reproduced. For reproducing the recorded video image made by the portable reader, its recorder or memory is later connected to a compatible photocopier machine, at the convenience of the user, to read out the stored video image into the photocopier where a "hard copy" reproduction is made by the machine.

SUMMARY OF THE INVENTION

According to the present invention there is provided a similar photocopy system having a detachable, portable optical reader with a memory or recorder of the kind previously disclosed in said earlier application together with a number of additional features.

One of the additional features includes a Visual Display means or indicator means as part of the portable reader for indicating whether the video image has been properly recorded or stored in the portable memory. This enables the user to insure that a legible and reproducable copy of the document or item to be copied has been temporarily "captured" and retained in the portable recorder or memory. If an insufficient video image has been made, the user may erase the improper or incomplete video image and make another while the document to be copied is still available to the portable reader. On the other hand, if the recorder or stored video image is shown to be sufficient by the display or indicator, the user may then return the original document to its depository and proceed to make "temporary" recorded copies of other documents as may be needed.

Another of the additional features of the present invention includes an adjustable margin setting mechanism as part of the reader that enables the portable reader to observe and "temporarily" record documents or images of different size and shape in a more efficient manner. This mechanism includes an adjustable frame or outline setting means associated with the portable reader that the user adjusts to manually approximate the size of the document or image to be copied. This adjustable mechanism is coupled to an adjustable optical image focusing means within the portable reader that focuses the optical image of the document upon the internal optical sensor within the portable reader, thereby to more efficiently use the internal optical sensor for reading documents or objects of different size or shape.

In a preferred embodiment of the invention the portable optical reader is entirely comprised of solid state electronic components other than the optical focusing elements. These solid state components include a light intensity controlled electronic flash for uniformily illuminating the document or item to be copied, a solid-state optical-electrical sensor for receiving the optical image, a solid state memory or recorder such as a detachable cassette type bubble memory, and a solid state indicator such as an LCD panel or strip.

BRIEF DESCRIPTION OF THE DRAWINGS

Referring to FIG. 1, the portable, detachable image reader for the photocopy system is provided within a flat easily carried housing 10 that may be conveniently carried by hand or in a brief bag to the location of documents 18 or items to be copied in a library or elsewhere where a photocopy machine may not be present or available. On its underside, the reader is provided with a series of detachable or foldable space legs such as 11, 12, 13, and 14 for supporting the body of the reader 10 at a fixed distance above or away from the document 18 to be copied.

In the event that the body or housing 10 of the reader and its internal optics are laterally dimensioned proportionally to the size of the document to be copied, the legs 11, 12, 13, and 14 may be made short so that the underside of the reader 10 is close to the surface of the document 18, to reduce the light illuminating power capacity and to prevent reflected illuminating light from the reader 10 from disturbing other persons nearby.

Figure 1:
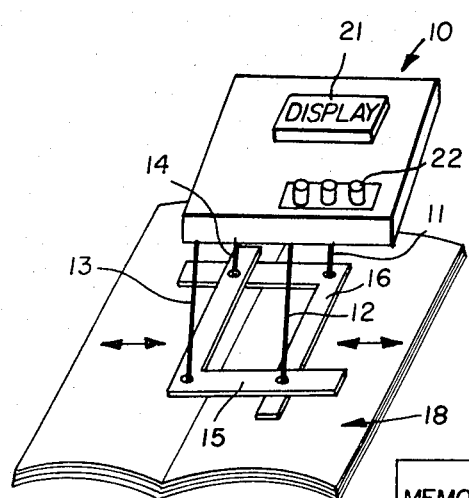
FIG. 1 is a perspective view, partially schematic, illustrating a preferred portable reader.

If desired, roll-up and roll-down flexible curtains 19 and 20 may be provided as shown in FIG. 1a and lowered from the sides of the housing 10 to enclose the space between the underside of the reader housing 10 and the document 18, thereby to prevent spurious light from the unit escaping into the surrounding areas.

Figure 3A:
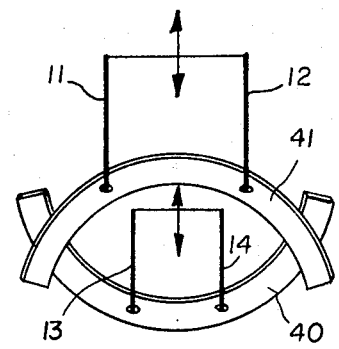
FIG. 3A is a plan view of alternative masking components.
Figure 3:
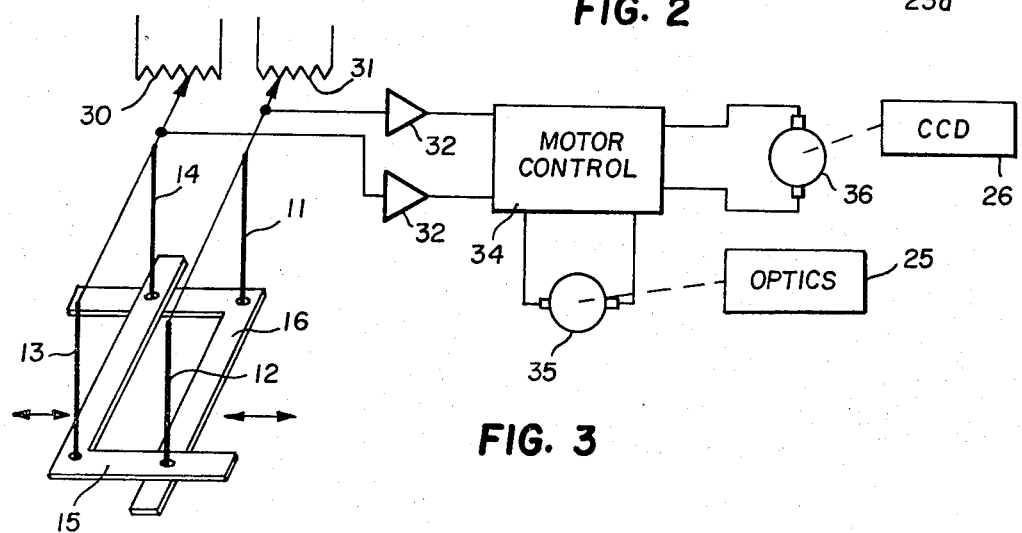
FIG. 3 is an electro-mechanical schematic view, showing the image masking and automatic focusing servo for the portable reader.

For the purpose of both adjustably selecting and masking the portions of the document 18 to be copied as well as maintaining the document or item in a flattened condition while it is being "temporarily" copied, a pair of flat L-shaped framing members 15 and 16 are attached to the base of the supporting members 11, 12, 13, and 14. As shown, the framing members 15 and 16 are disposed in opposing mirror image arrangement to provide a rectangular framing area, inside of the L-shaped members. As best shown in FIG. 3, the L-shaped framing members 15 and 16 are adjustable toward and away from each other in the plane of the document 18 to selectively diminish or enlarge the framed area to be copied and, as will be described hereafter, this adjustment also adjusts the optical focusing of elements within the reader so that both smaller and larger documents 18 are more efficiently copied.

Returning to FIG. 1, a display panel 2 is provided on the upper side of the reader 10, as well as a control panel 22 with push buttons, to initiate illumination of the document 18 and control of the copying functions. The display panel 2 is for the purpose of visually indicating to the user whether a reproducable copy of the document 18 has been made by the optical reader 10 and has been "temporarily" recorded. Since a "hard" copy may not be made from the "temporary" recording until a later time, and often at a different location, if a reproducable image has not been captured and retained by the portable reader 10, it is necessary for the user to return to the location or repository of document 18 and make another "temporary" video image.

It will be appreciated that the word "temporary" is used herein to mean that a recording or memory is made of the video image to be copied but that a "hard" paper copy is not being made at that time.

In the event that the indicator panel 2 shows that a reproducable copy has not been made, the incomplete or defective "temporary" image is then erased by the user and a second video image is made and retained while the document 18 is still available.

Figure 2:
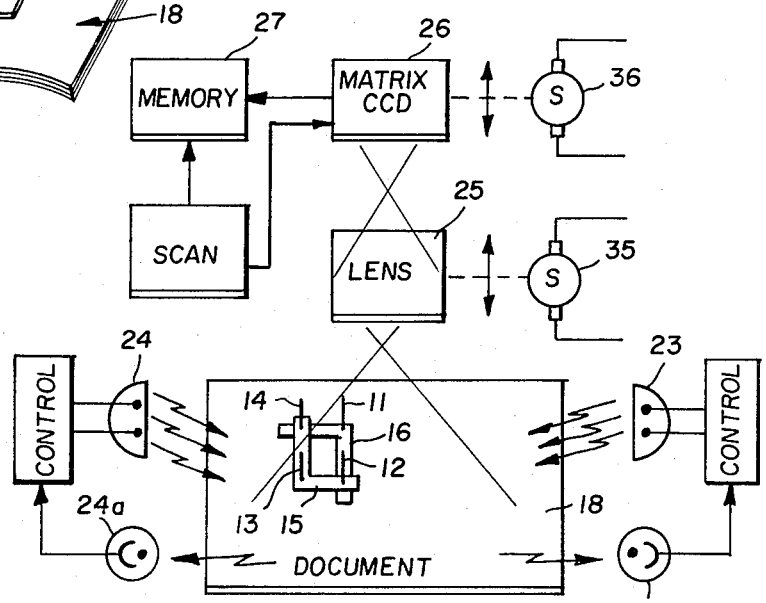
FIG. 2 is a perspective view, partially schematic and partially in block diagram form, illustrating the internal components of the portable reader.

As described in earlier application Ser. No. 925,290, referred to above, the internal components of the portable image reader 10 generally include, as shown in FIG. 2, an illuminating source or sources such as 23, 24; an optical system, using lens or mirrors 25 to focus the optical image 18 to be copied; an optical-electrical sensor 26 to receive the focused image and produce an electrical video image; and a memory 27 or recorder for "temporarily" retaining the video image so that it may be displayed and/or reproduced in hard copy form at a later time at the convenience of the user.

In addition to these components, as earlier disclosed, the present invention provides an adjustable framing mechanism for enabling the user to adjustably select the area of the image 18 to be copied, and to automatically adjust the focusing of the optical elements 25 so that only the selected area of document 18 is observed and "temporarily" recorded by the memory 27 of portable reader 10.

For automatically adjusting the optical focusing, as best shown in FIG. 3, the user displaces the two L-shaped framing members 15 and 16 toward and away from each other as required, so that the area defined within the inside periphery of members 15 and 16 encompasses the desired portion of the image 18 to be copied. The spacer and support arms 13 and 14 connecting the frame member 15 to the reader 10 are connected at their opposite ends to the movable slider of a resistive transducer 30 that senses the lateral position of the L-shaped member 15. Similarly arms 11 and 12 are connected to transducer 31. These two position signals are together representative of the area or the portion of the document 18 to be copied, and each signal is amplified by a different one of amps 32 and 33, and the two are then combined by motor control circuitry 34 to energize servo motors 35 and 36. Servo motor 35 is employed to adjustably position the optical lens or mirror focusing elements 25, as shown in FIG. 2, and servo motor 36 positions the optical electrical sensor 26 as also shown. The relative spacing apart of all three elements, including the optical image 18, the lens 25, and the sensor 26, are so adjusted by these servos as to optically focus the selected portion of the image 18 on the sensor 26 as shown in FIGS. 4 and 5.

Figure 4:
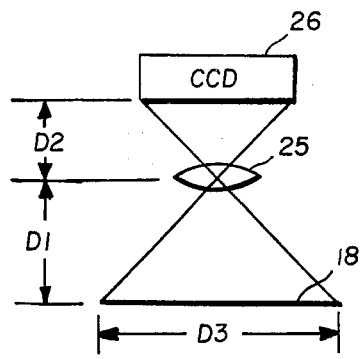
FIG. 4 and FIG. 5 are diagrammatic views illustrating the focusing functions.
Figure 5:
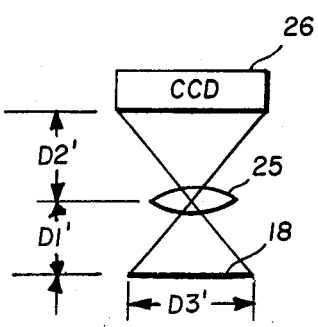

Referring to FIG. 4 it is observed that where the area or portion of the document 18 to be copied is larger (D3), then the lens 25 is spaced at a greater distance D1 from document 18, and the sensor 25 is at a distance D2. However, when the area of document 18 to be copied is smaller D3', the lens 25 is positioned closer to the document 18 (D1') and similarly, the sensor 26 is moved proportionally closer to the lens 25 (D2'). Thus for each different selected area or document to be copied, the user adjusts the L-shaped framing members 15 and 16 to encompass the area to be copied, and the motor controlled servo system automatically focuses the optical image on the sensor 25. It will be appreciated that in this manner, the entire surface area of the optical-electrical sensor 26 is always used regardless of the size or area dimensions of the optical image to be recorded. Since the preferred optical sensor 26 in a portable reader 10 is a solid state optical-electrical panel, such as a CCD Matrix (charged coupled device matrix) or the like, the entire matrix sensor is used for all different size documents to be recorded.

Since the relative spacing apart of the lens 25, the sensor 26, and document 18 are all interrelated to one another and in proportion, a more simplified focusing servo system may be employed using only one adjustable L-shaped member 15, a fixed L-shape frame and only one servo motor, such as 35. Similarly, otherwise shaped framing members may be used, such as the arcuately shaped framing members 40 and 41 in FIG. 3a.

For illuminating the document 18 to be "temporarily" copied, one or more battery powered electronic photoflash light sources such as 23, and 24 may be used. These, available solid state flash units are commonly employed for various photograph purposes and are also commonly provided with an automatic light sensitive photocell control 23a and 24a to maintain a constant level of illumination of the subject. Such constant level ilumination is particularly important in the present invention, since documents of different surface areas and different reflectivities are being read and "temporarily" recorded or memorized in the memory 27.

As is well known to those skilled in the art, these automatically controlled electronic flash units provide constant illumination of different subjects, at different distances, by providing more or less light energy as needed by controlling the time duration of electrical energization of the flashing unit, all as controlled by the photocell sensors 23a and 24a associated with each said unit, that respond to the intensity of light reflected from the document 18.

Figure 6:
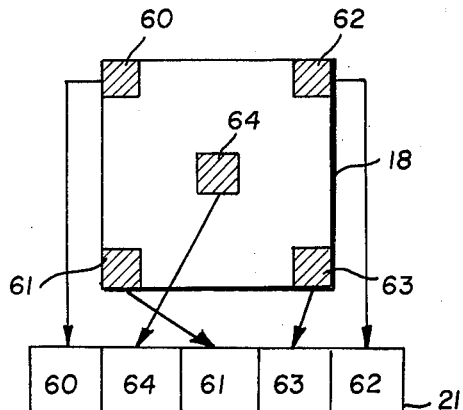
FIG. 6 and FIG. 7 are diagrammatic views showing different image sampling patterns.
Figure 7:
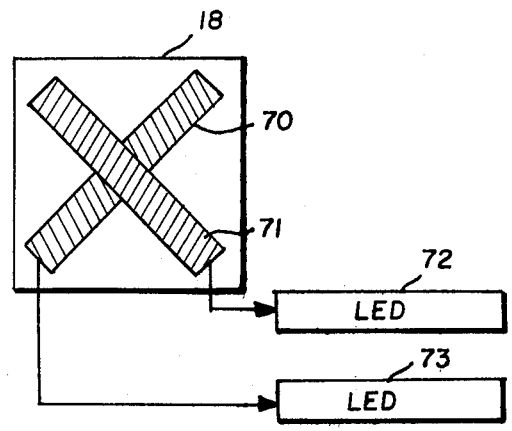

To provide an indication to the user on the display 21 that a reproducable copy of the optical image 18 has been read and "temporarily" stored in the memory 27, it is not essential that the entire "stored" video image be tested and/or displayed but only that an estimate or sampling be made of the quality of the stored image that is sufficient to insure that the stored image is reproducable at a latter time. According to the present invention this is performed in one embodiment by sampling portions of the "stored" video image, less than the entire image, that provide a reasonable assurance that the entire "stored" image is complete and reproducible. One manner of accomplishing this estimate sampling is to sample widely disconnected areas of the stored image, and display only those few sampled areas as shown in FIG. 6. Referring to FIG. 6, image areas at the four outer corners 60, 61, 62, and 63 of the stored video image in the memory 27 may be read-out, together with a region 64 at the center of the stored image. These sampled areas are then applied to a single line solid state display panel, such as panel or indicator 21 in FIG. 1, to visually display the sampled portions of the image 18 (at the corners and center). Where all four corners and the center of the image 18 have been reproducably recorded, as shown by the display 21, there is reasonable assurance that the entire image has been properly stored Alternatively, a series of continuous areas of the stored image 18 may be sampled, as shown in FIG. 7, by reading the line of contiguous sampled areas 70 and/or 71, thereby to provide a sampled cross section of the image extending continuously from the corner to the opposite corner as from all four. In this embodiment a pair of line displays 72 and 73 may be provided, each visually displaying a different one of the contiguously sampled areas.

It will be appreciated that each line display 72, and 73 need only show sufficient sampled areas of the stored video image to provide reasonable assurance that the entire video image has been sufficiently well recorded so that the stored image may be reproduced in hard copy form at a later time.

Figure 8:
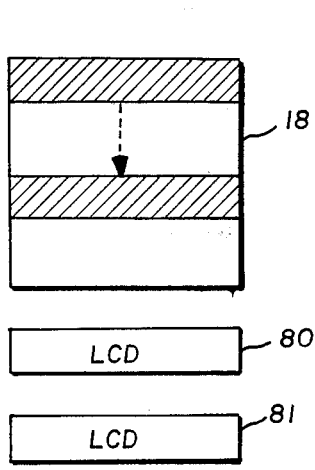
FIG. 8 is a diagrammatic view, similar to FIGS. 6 and 7, showing entire image sampling.

As a still further alternative embodiment, the entire stored video image may be scanned in successive time delayed incremental areas and each incremental area may be displayed in time sequence employing a single or dual line indicator 80 or 81 as shown in FIG. 8. Again, it is not necessary that the entire image be shown or displayed simultaneously since the user need only observe each succeeding spatial area as it is successively displayed to insure that sufficient clarity, detail, contrast, and other evidence of reproducability exists. In all of these alternative embodiments, or variations thereof, it is appreciated that the visual display line or panel 21 is considerably less complex and less expensive that a full page type display, yet all provide a reasonably good estimate or assurance that a reproducable video image either has, or has not, been temporarily stored in the memory 27.

Figure 9:
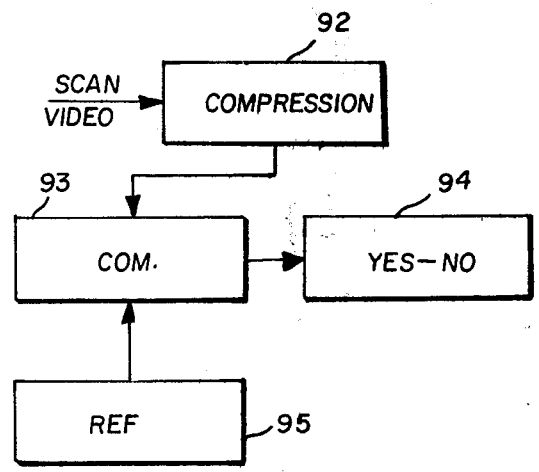
FIG. 9 is a block diagram showing an alternative circuit for indicating reproducability of the stored video image.

As a still further alternative, the entire video image or significant portions thereof may be read-out, and subjected to data compression 92 and comparison at 93 with a reference 95 and applied to a yes-no indicator 94, all as shown in FIG. 9. In this embodiment the electronic circuitry 92, 93, and 95 performs the descretionary function of determining the degree of reproducability of the stored video image instead of the user, thereby enabling still further simplification of the indicator 94 which may be a simple visual, aural, or other on-off type device. Of course, if it is desired to still further simplify the display and/or indicator as well as the electronic circuitry, a few selected portions of the image 18, less than the entire image, may be sampled as illustrated in FIGS. 6 or FIG. 7, and each sampled area may be succesively tested by the electronics to determine average contrast, continuity, and other factors indicative of a reproducable image, and the result of such tests applied to a simplified "yes-no" or "on-off" type indicator to estimate the extent of reproducability of the stored image.

Figure 10:
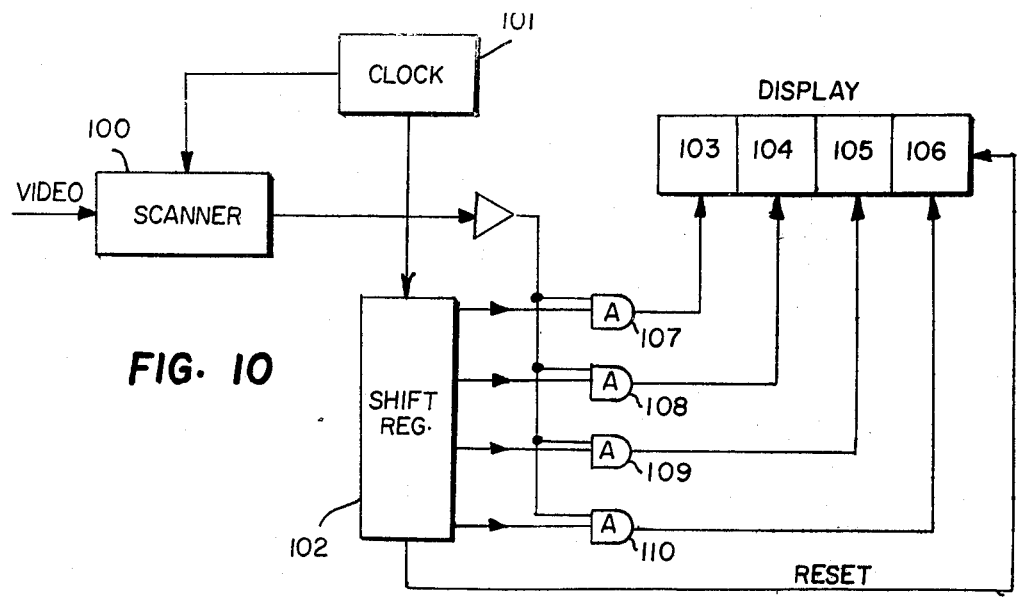
FIG. 10 is a block diagram showing a circuit for indicating reproducability employing the entire video image.
Figure 11:
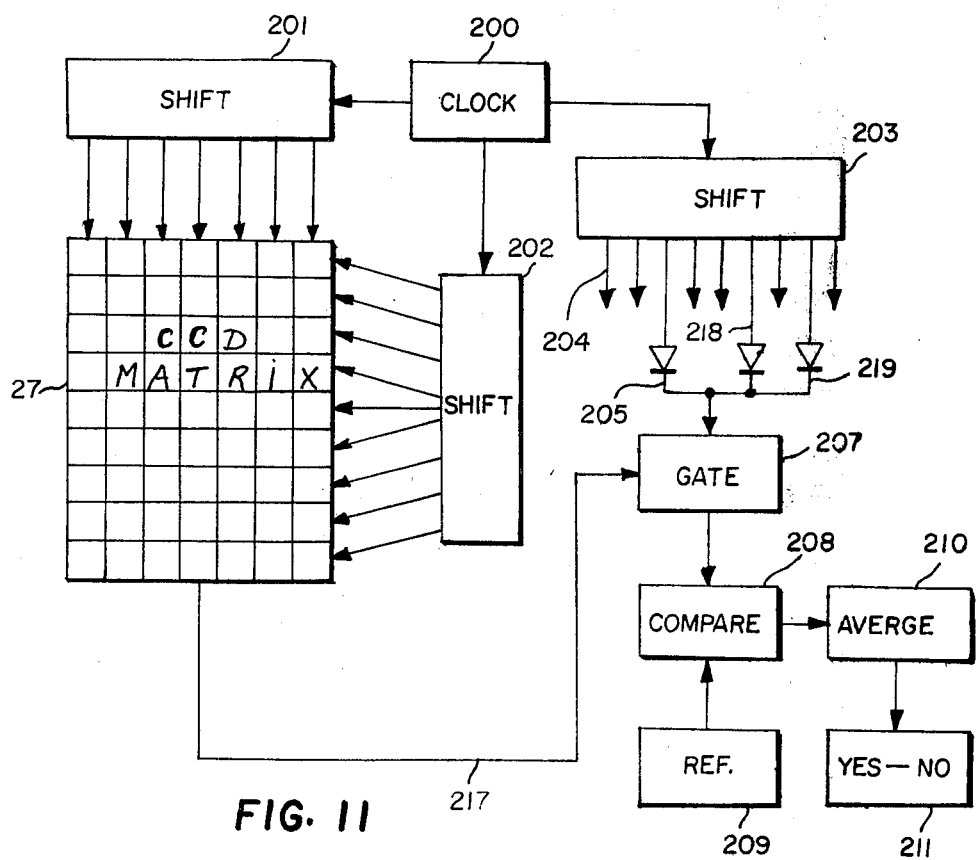
FIG. 11 is a block diagram showing a sampling circuit for indicating reproducability of the video image using only sampled portions of the image.

FIG. 10 is a block diagram showing circuitry for sequentially displaying the entire video image in an incremental fashion on a single line display, as described in FIG. 8. The video image that has been "temporarily" stored in the portable memory 27 is scanned and non-destructively read-out by scanner 100, in a conventional fashion either line-by-line, or circular, all as synchronized by a clock circuit 101. Each read-out video area is applied to all of a series of "AND" gate circuits, including gates 107, 108, 109, and 110. A shift register 102 is also syncronized with the scanning of memory 27 by being pulsed by the same clock 101, and each of its sequentially energized output stages is directed to energize a different one of the "AND" gate circuits 107 to 110. As a result, each succeeding increment of the video signal being read-out from memory 27 is passed by a different one of the gates. Each different gate is, in turn, connected to control the energization of a different area 103 to 106 of the one line or two line indicator 103 to 106, whereby as each different line of the memory 27 is read-out that line is displayed on the one line indicator 103 to 106. At the termination of each line scan, a reset pulse is produced by the shift register 102 to reset the single line indicator 103 to 106 in preparation for receiving and displaying the next line of video being read-out by the scanner 100. In the same manner, each succeeding line of video is read-out of memory 27 and is visually indicated in sequence on the one line indicator. It will be appreciated that circular, eliptical, and other forms of scanning of the "temporarily" stored video image may also be employed, with similar result, with but minor variation of this circuitry. In this embodiment, or the described variations thereof, the indicator 103 to 106 displays the actual optical image, or a representation thereof, in an incremental line-by-line fashion. The rate of change of the line-by-line display is, of course, controlled by the frequency of the clock 101 and this may be made variable, if desired, to adjust the rate of the line display change.

Where it is desired to employ a simplified "yes-no" type of indicator for indicating whether a reproducable image has been temporarily recorded, the alternative circuitry of FIG. 11 may be employed. Here the solid state matrix memory 27, or other, is conventionally scanned in a line-by-line manner (incrementally), employing syncronized clock 200 and shift register circuitry 201 and 202 for concurrently pulsing the X and Y axis of the memory 27 as shown. The video output over line 217 comprises a sequential series of video signals produced in regular order for each successively scanned increment of each line of the memory 27. This regular and ordered sequence of video signals is directed to an "AND" gating circuit 207 that is intermittantly energized by a shift register 203 to pass only preselected ones of the increments of the video signals. As shown, this is performed by connecting only given ones of the output lines of shift register 203, such as 205, 218, and 219, to energize the gating circuit 207 and not connecting other lines such as 204 and 205. Since all output lines of register 203 are energized in regular time sequence by the clock 200, the gate 207 may be selectively opened and closed in any preselected time pattern desired by selecting the appropriate ones of the output lines of the register 203 to energize the gate 207. This enables any portion of the stored image to be sampled as disclosed in FIGS. 6 and 7 above.

Although the various circuits including the gates, shift registers and others are described and shown in the form of single blocks in FIGS. 10 and 11 above, it will be appreciated that in a preferred embodiment, solid state circuit chips are employed and that the appropriate gating functions and shift register scanning functions are performed by using banks of individual gates and registers, all of which are presently available on single and multiple circuit chips.

Returning to FIG. 11, each selected increment of video signal being passed by the gating circuit 207 is directed to a comparing circuit where it is analyzed for contrast, clarity, and the like, by comparing it to an appropriate reference or series of references from 209; and the "yes-no" output or outputs thereof are combined by an averaging circuit 210. When a sufficient number of "yes" signals are accumulated or averaged to provide reasonable assurance that a reproducable image has been "temporarily" recorded in the memory 27, the "yes-no" indicator 211 is energized to so inform the user, either visually, aurally, or by other appropriate means.

It will be appreciated by those skilled in the art that image analysis and recognition techniques such as those described are disclosed in many publications and patents. Accordingly further description of such known circuits are not believed to be needed in the present application. Moreover, other available image analysis circuits may also be used to analyze the "temporarily" stored video image in the memory 27, either in sampled increments as described or completely, and to estimate from such analysis whether a reproducable image has been "temporarily" recorded. If it has, the "yes-no" indicator 211 is then energized to so inform the user; and if it has not, the indicator 211 is not. Alternatively two such indicators may be used (not shown) with one being energized for "yes" and the other for "no."

I claim:

1. A portable, detachable image reader for a photocopy machine including an optical-electrical sensor for producing a video image of the optical image to be recorded, a high intensity light source, a memory means for temporarily retaining the video image, and a battery energized power supply for energizing the sensor, light source, and memory means; the addition of sampling read-out means and display means for different spatial portions of the video image less than the entire image, thereby to indicate an estimate of the extent of hard copy reproducibility of the video image.

2. In the image reader of claim 1, said sampling read-out and display means sampling and displaying a series of separated, unconnected spatial regions of the video image in the memory.

3. In the image reader of claim 1, said sampling read-out and display, sampling a series of contiguous spatial regions of the video image in the memory.

4. In the image reader of claim 1, sequencing control means for said sampling read-out and display means for repetitively sampling said memory in a series of cycles, and in each cycle reading out and displaying a different group of spatial regions of the video image in the memory, thereby to estimate a greater proportion of the video image than can be simultaneously displayed on a limited content indicator.

5. In the image reader of claim 1, said sampling read-out means reading-out a greater spatial portion of the video image in the memory that is capable of being indicated in the display means, to provide sampled video signals, means data compressing said sampled video signals to estimate the extent of reproducibility of the video image in the memory, and means applying the data compressed sample video signals to the indicator means to indicate the estimated reproducibility of the video image in the memory.

6. In the portable image reader of claim 1, said high intensity light source comprising an electronic flash and light sensitive feedback controls for extinguishing the flash upon sensing a given level of illumination of the optical image to be recorded.

7. In the portable image reader of claim 1, an adjustable optical system for enabling the user of focus the optical-electrical sensor for reception of optical images of different areas.

8. In the portable image reader of claim 7, adjustable framing and support means for supporting the portable reader at a distance from a document to be copied and being manually adjustable to define the area of the image to be copied, an adjustable optical system for focusing optical images to be copied of different areas on the optical-electrical sensor, and means coupling said manually adjustable support means to the adjustable focusing means to focus images of different areas on the sensor.

9. In the reader of claim 1, a photocopy machine for making "hard" copies of video images and interfacing means for detachably coupling the memory of the reader to the photocopy machine for reading-out the temporarily retained image and making a hard copy.

10. A portable detachable image reader for a photocopy machine including an optical-electrical sensor for producing a video image, a light source, a memory for "temporarily" retaining the video image, adjustable framing means for defining the area of the image to be copied, an adjustable optical system for focusing optical images of different size on the sensor, and means coupling the adjustable framing means to the adjustable optical system for automatically focusing images of different size.

11. In the reader of claim 10, means associated with the reader for indicating whether a reproducable video image has been temporarily retained by the memory.

12. In the reader of claim 10, a photocopy machine for making "hard" copies of video images and interfacing means for detachably coupling the memory of the reader to the photocopy machine.

* * * * *